(12) United States Patent
Zhang

(10) Patent No.: US 9,146,439 B2
(45) Date of Patent: Sep. 29, 2015

(54) COLOR ELECTROPHORETIC DISPLAY

(75) Inventor: Xiaojia Zhang, Fremont, CA (US)

(73) Assignee: E Ink California, LLC, Fremont, CA (US)

( * ) Notice: Subject to any disclaimer, the term of this patent is extended or adjusted under 35 U.S.C. 154(b) by 0 days.

(21) Appl. No.: 13/360,378

(22) Filed: Jan. 27, 2012

(65) Prior Publication Data

US 2012/0194899 A1   Aug. 2, 2012

Related U.S. Application Data

(60) Provisional application No. 61/438,171, filed on Jan. 31, 2011.

(51) Int. Cl.
  *G02B 26/00*   (2006.01)
  *G02F 1/167*   (2006.01)

(52) U.S. Cl.
  CPC .......... *G02F 1/167* (2013.01); *G02F 2001/1678* (2013.01)

(58) Field of Classification Search
  CPC ..................... G02F 1/167; G02F 2001/1678
  USPC ................................................. 359/290–297
  See application file for complete search history.

(56) References Cited

U.S. PATENT DOCUMENTS

| | | | |
|---|---|---|---|
| 3,892,568 A | 7/1975 | Ota | |
| 4,298,448 A | 11/1981 | Muller et al. | |
| 5,378,574 A | 1/1995 | Winnik et al. | |
| 5,980,719 A | 11/1999 | Cherukuri et al. | |
| 6,198,809 B1 | 3/2001 | Disanto et al. | |
| 6,323,989 B1 * | 11/2001 | Jacobson et al. | 359/296 |
| 6,337,761 B1 | 1/2002 | Rogers et al. | |
| 6,373,461 B1 | 4/2002 | Hasegawa et al. | |
| 6,486,866 B1 | 11/2002 | Kuwahara et al. | |
| 6,538,801 B2 | 3/2003 | Jacobson et al. | |
| 6,693,620 B1 | 2/2004 | Herb et al. | |
| 6,704,133 B2 | 3/2004 | Gates et al. | |
| 6,724,521 B2 | 4/2004 | Nakao et al. | |
| 6,729,718 B2 | 5/2004 | Goto et al. | |
| 6,864,875 B2 | 3/2005 | Drzaic et al. | |
| 7,009,756 B2 | 3/2006 | Kishi et al. | |
| 7,038,655 B2 | 5/2006 | Herb et al. | |
| 7,038,670 B2 | 5/2006 | Liang et al. | |
| 7,046,228 B2 | 5/2006 | Liang et al. | |

(Continued)

FOREIGN PATENT DOCUMENTS

| | | |
|---|---|---|
| EP | 1 089 118 | 4/2001 |
| WO | WO 99/53373 | 10/1999 |

(Continued)

OTHER PUBLICATIONS

U.S. Appl. No. 13/225,184, filed Sep. 2, 2011, Wang et al.

(Continued)

*Primary Examiner* — Scott J Sugarman
*Assistant Examiner* — Vipin Patel
(74) *Attorney, Agent, or Firm* — Perkins Coie LLP

(57) ABSTRACT

This invention relates to an electrophoretic display fluid comprising non-charged or slightly charged color particles and at least one type of charged pigment particles, all dispersed in a solvent or solvent mixture, and an electrophoretic display device utilizing such a display fluid. The electrophoretic fluid of the present invention provides improved image qualities.

22 Claims, 7 Drawing Sheets

(56) References Cited

U.S. PATENT DOCUMENTS

| | | | |
|---|---|---|---|
| 7,050,218 | B2 | 5/2006 | Kanbe |
| 7,075,502 | B1 | 7/2006 | Drzaic et al. |
| 7,283,199 | B2 | 10/2007 | Aichi et al. |
| 7,365,732 | B2 | 4/2008 | Matsuda et al. |
| 7,417,787 | B2 | 8/2008 | Chopra et al. |
| 7,545,557 | B2 | 6/2009 | Iftime et al. |
| 7,548,291 | B2 | 6/2009 | Lee et al. |
| 7,982,941 | B2 | 7/2011 | Lin et al. |
| 8,072,675 | B2 | 12/2011 | Lin et al. |
| 2002/0033792 | A1 | 3/2002 | Inoue |
| 2002/0171620 | A1 | 11/2002 | Gordon et al. |
| 2003/0002132 | A1 | 1/2003 | Foucher et al. |
| 2003/0076573 | A1* | 4/2003 | Gates et al. .................. 359/245 |
| 2003/0095094 | A1 | 5/2003 | Goden |
| 2003/0107631 | A1 | 6/2003 | Goto et al. |
| 2003/0132908 | A1 | 7/2003 | Herb et al. |
| 2004/0051935 | A1 | 3/2004 | Katase |
| 2004/0113884 | A1 | 6/2004 | Albert et al. |
| 2004/0136048 | A1 | 7/2004 | Arango et al. |
| 2004/0263946 | A9* | 12/2004 | Liang et al. .................. 359/296 |
| 2004/0263947 | A1 | 12/2004 | Drzaic et al. |
| 2005/0151709 | A1 | 7/2005 | Jacobson et al. |
| 2005/0190431 | A1* | 9/2005 | Matsuda ....................... 359/296 |
| 2006/0202949 | A1* | 9/2006 | Danner et al. ................ 345/107 |
| 2007/0188848 | A1* | 8/2007 | Machida et al. .............. 359/296 |
| 2007/0268244 | A1* | 11/2007 | Chopra et al. ................ 345/107 |
| 2009/0034054 | A1 | 2/2009 | Ikegami et al. |
| 2009/0213452 | A1 | 8/2009 | Lin et al. |
| 2009/0251763 | A1 | 10/2009 | Sprague et al. |
| 2009/0268274 | A1* | 10/2009 | Masuzawa et al. ........... 359/296 |
| 2010/0020384 | A1* | 1/2010 | Machida et al. .............. 359/296 |
| 2010/0165005 | A1 | 7/2010 | Sprague |
| 2010/0165448 | A1 | 7/2010 | Sprague |
| 2011/0217639 | A1 | 9/2011 | Sprague |
| 2011/0261433 | A1 | 10/2011 | Sprague et al. |
| 2011/0292094 | A1 | 12/2011 | Lin |

FOREIGN PATENT DOCUMENTS

| | | |
|---|---|---|
| WO | WO 03/016993 | 2/2003 |
| WO | WO 2007/013682 | 2/2007 |
| WO | WO 2009/105385 | 8/2009 |
| WO | WO 2009/124142 | 10/2009 |
| WO | WO 2009/134889 | 11/2009 |
| WO | WO 2010/027810 | 3/2010 |

OTHER PUBLICATIONS

U.S. Appl. No. 13/300,178, filed Nov. 18, 2011, Sprague et al.
U.S. Appl. No. 13/360,378, filed Jan. 27, 2012, Zhang.

\* cited by examiner

COLOR ELECTROPHORETIC DISPLAY

This application claims priority to U.S. Provisional Application No. 61/438,171, filed Jan. 31, 2011; the content of which is incorporated herein by reference in its entirety.

FIELD OF THE INVENTION

This invention relates to a color electrophoretic display utilizing non-charged or slightly charged color particles.

DESCRIPTION OF RELATED ART

In order to achieve a multicolor display, color filters are often used. The most common approach is to add color filters on top of black/white sub-pixels of a pixellated display to display the red, green and blue colors. When a red color is desired, the green and blue sub-pixels are turned to the black state so that the only color displayed is red. When the black state is desired, all three sub-pixels are turned to the black state. When the white state is desired, the three sub-pixels are turned to red, green and blue, respectively, and as a result, a white state is seen by the viewer.

A major disadvantage of such a technique is that since each of the sub-pixels has a reflectance of about one third (⅓) of the desired white state, the white state is fairly dim. To compensate this, a fourth sub-pixel may be added which can display only the black and white states, so that the white level is doubled at the expense of the red, green or blue color level (where each sub-pixel is only one fourth [¼] of the area of the pixel).

Brighter colors can be achieved by adding light from the white pixel; but this is achieved at the expense of color gamut to cause the colors to be very light and unsaturated. A similar result can be achieved by reducing the color saturation of the three sub-pixels. Even with that, the white light level is normally substantially less than half of that of a black and white display, rendering it an unacceptable choice for display devices, such as e-readers or displays that need well readable black-white brightness and contrast.

SUMMARY OF THE INVENTION

The first aspect of the present invention is directed to an electrophoretic display fluid, which comprises non-charged or slightly charged color particles and at least one type of charged pigment particles dispersed in a solvent or solvent mixture.

In one embodiment, the fluid further comprises a second type of charged pigment particles and the two types of charged pigment particles are oppositely charged.

In one embodiment, the fluid comprises charged white pigment particles and charged black pigment particles.

In one embodiment, the slightly charged color particles carry the same charge polarity as the black charged pigment particles.

In another embodiment, the slightly charged color particles carry the same charge polarity as the white charged pigment particles.

In one embodiment, the non-charged or slightly charged color particles are red, green or blue.

In one embodiment, the slightly charged color particles have a zeta potential of less than 20.

In one embodiment, the solvent or solvent mixture is clear and colorless.

In one embodiment, the solvent is a hydrocarbon solvent.

In one embodiment, the fluid further comprises a charge control agent.

In one embodiment, the fluid comprises only one type of charged pigment particles.

In one embodiment, the charged pigment particles are white and the non-charged or slightly charged color particles are red, green, blue or black.

The second aspect of the present invention is directed to an electrophoretic display comprising display cells wherein each of the display cells is filled with an electrophoretic display fluid comprising non-charged or slightly charged color particles and at least one type of charged pigment particles dispersed in a solvent or solvent mixture.

In one embodiment, three display cells form a pixel and a first display cell is filled with a display fluid comprising non-charged or slightly charged red particles, a second display cell is filled with a display fluid comprising non-charged or slightly charged green particles and a third display cell is filled with a display fluid comprising non-charged or slightly charged blue particles.

In one embodiment, each of the display cells is a sub-pixel.

In one embodiment, the non-charged or slightly charged particles are of the same color in all display cells.

The electrophoretic fluid of the present invention provides improved image qualities.

DETAILED DESCRIPTION OF THE INVENTION

Figure 1A:
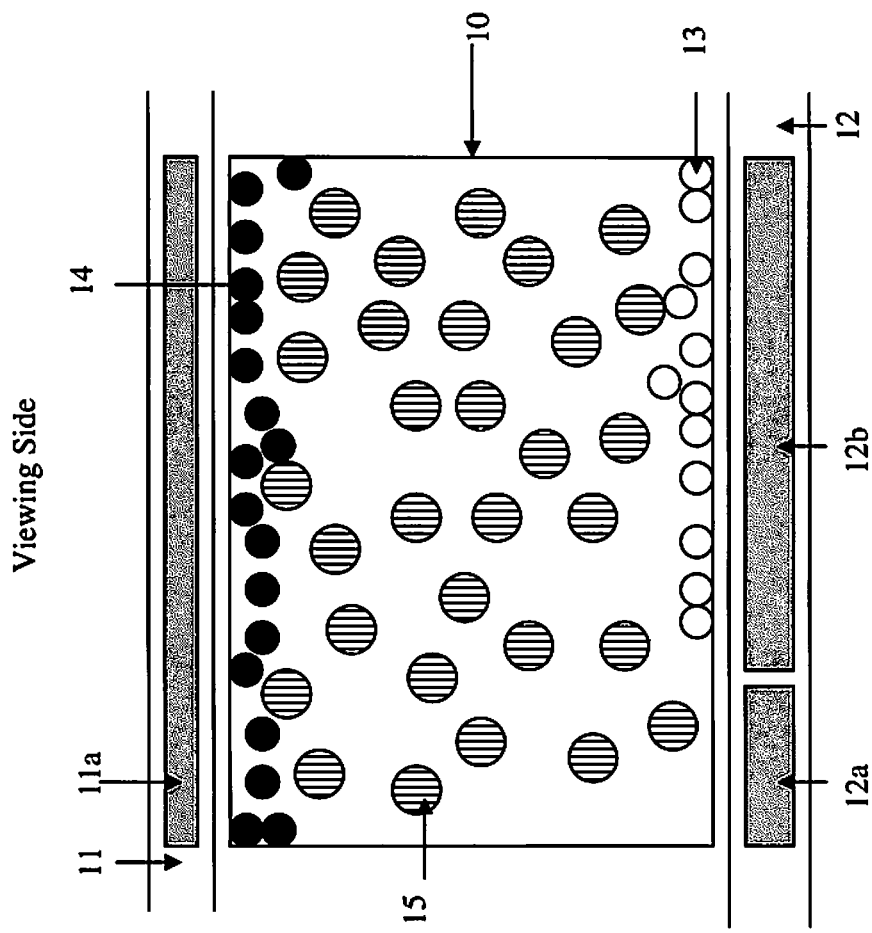
FIGS. 1a-1c depict how an electrophoretic display utilizing non-charged or slightly charged color particles displays different color states.

The present invention is directed to an electrophoretic fluid comprising non-charged or slightly charged color particles (for example, with a zeta potential of <20) and at least one type of charged pigment particles (for example, with an average zeta potential of greater than 20) dispersed in a solvent or solvent mixture.

The display fluid filled in each of the display cells (e.g., microcups) comprises at least two types of particles dispersed in a dielectric solvent or solvent mixture.

In the first aspect of the present invention, the display fluid comprises three types of particles, white charged pigment particles, black charged pigment particles and non-charged or slightly charged color particles, dispersed in a dielectric solvent or solvent mixture.

The white charged pigment particles may be any types of white pigment particles, including inorganic, organic or polymeric white particles. To achieve a high light scattering, pigments of a high refractive index are particularly useful. Suitable white pigment particles may include $TiO_2$, $BaSO_4$ and ZnO, with $TiO_2$ being the most preferred. The white pigment particles may be positively charged or negatively charged.

The black charged pigment particles may also be inorganic, organic or polymeric black particles. Examples may include manganese ferrite black spinel, copper chromite black spinel, carbon black, zinc sulfide, stained black polymer particles or particles formed from other color absorbing materials. The black pigment particles and the white pigment particles are oppositely charged.

The charged pigment particles may also be encapsulated pigment particles.

The two types of charged pigment particles may exhibit a native charge, or may be charged explicitly using a charge control agent, or may acquire a charge when suspended in a solvent or solvent mixture.

Suitable charge control agents are well known in the art; they may be polymeric or non-polymeric in nature or may be ionic or non-ionic.

The ionic surfactants may include (a) the anionic type: alkane carboxylic salts, alkane sulfonic salts, such as Aerosol OT, alkyl-aromatic sulfonic salts, such as sodium dodecyl-benzenesulfonate, isopropylamine, alkyl benzene sulfonate, phosphates, phosphoric salts or the like, and (b) the cationic type: fatty amine salts, quaternary ammonium salts, alkyl pyridium salts or the like.

The non-ionic surfactants may include sorbitan monoesters, polyethoxylated nonionics, polybutene succinimide, maleic anhydride copolymers, vinylpyridine copolymers, vinylpyrrolidone copolymer (such as Ganex™ from International Specialty Products), (meth)acrylic acid copolymers, N,N-dimethylaminoethyl(meth)acrylate copolymers and the like.

Fluorosurfactants are particularly useful as charge controlling agents in a fluorocarbon solvent. These include FC fluorosurfactants such as FC-170C™, FC-171™, FC-176™, FC430™, FC431™ and FC-740™ from 3M Company and Zonyl™ fluorosurfactants such as Zonyl™ FSA, FSE, FSN, FSN-100, FSO, FSO-100, FSD and UR from Dupont.

The non-charged or slightly charged color particles may be red, green or blue particles.

The non-charged or slightly charged color particles are substantially transparent and the color transparency comes from the refractive index similarity between the color particles and the solvent in which the particles are dispersed.

If the refractive index of the non-charged or slightly charged color particles is not matched to that of the solvent in which the particles are dispersed, the particles may scatter light in the display medium. In order to eliminate problems associated with the mismatch of the refractive indices, the size of the non-charged or slightly charged color particles is preferably in the nanometer range, more preferably less than 100 nanometer. Materials for this type of non-charged or slightly charged color particles may include, but are not limited to, commercially available colorants used in the LCD industry for color filter applications, such as Clariant's Hostaperm Red D2B-COF VP 3781 (i.e., red 254) which is in the class of diketopyrrolopyrrole, Hostaperm Blue E3R-COF VP3573 (i.e., blue 15:6) which is in the class of phthalocyanine, or Hostaperm Violet RL-COF O2 VP3101 (i.e., violet 23) which is in the class of dioxazine.

In another embodiment, the non-charged or slightly charged color particles may have a transparent polymeric matrix and with dye molecules solubilized in the matrix. Since it is easier to match the refractive indices of a polymer matrix and the surrounding fluid medium, the size of the particles does not need to be tightly controlled. Examples of this type of non-charged or slightly charged color particles may include, but are not limited to, dyed polymeric microparticles supplied by Merck Chemicals Ltd.; dyed polystyrene particles supplied by Spherotech Inc. or the like. For the color particles with a transparent polymeric matrix, the dye soluble therein is much more dilute and adjustable. For example, the concentration of the red dye in the red particles may be adjusted to allow only the blue or green colors to be absorbed and the red color to pass through. With a white background to reflect the red color, the red color brightness can be maximized.

The color particles are non-charged or slightly charged. However, if they carry a slight charge, the charge polarity is preferably the same as that of the charged white pigment particles. As a result, the slight charge of the color particles may move the color particles away from the black particles, which results in better color saturation.

Alternatively, the non-charged or slightly charged particles may carry a slight charge the polarity of which is the same as that of the charged black pigment particles.

The three types of particles are dispersed in a solvent or solvent mixture to form a display fluid.

The solvent or solvent mixture in which the particles are dispersed preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil, silicone oil, such as DC200 from Dow Corning, aromatic hydrocarbons such as toluene, xylene, phenylxylylethane, dodecylbenzene or alkylnaphthalene; halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene; and perfluorinated solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del. The solvent or solvent mixture is preferably clear and colorless.

Figure 1B:
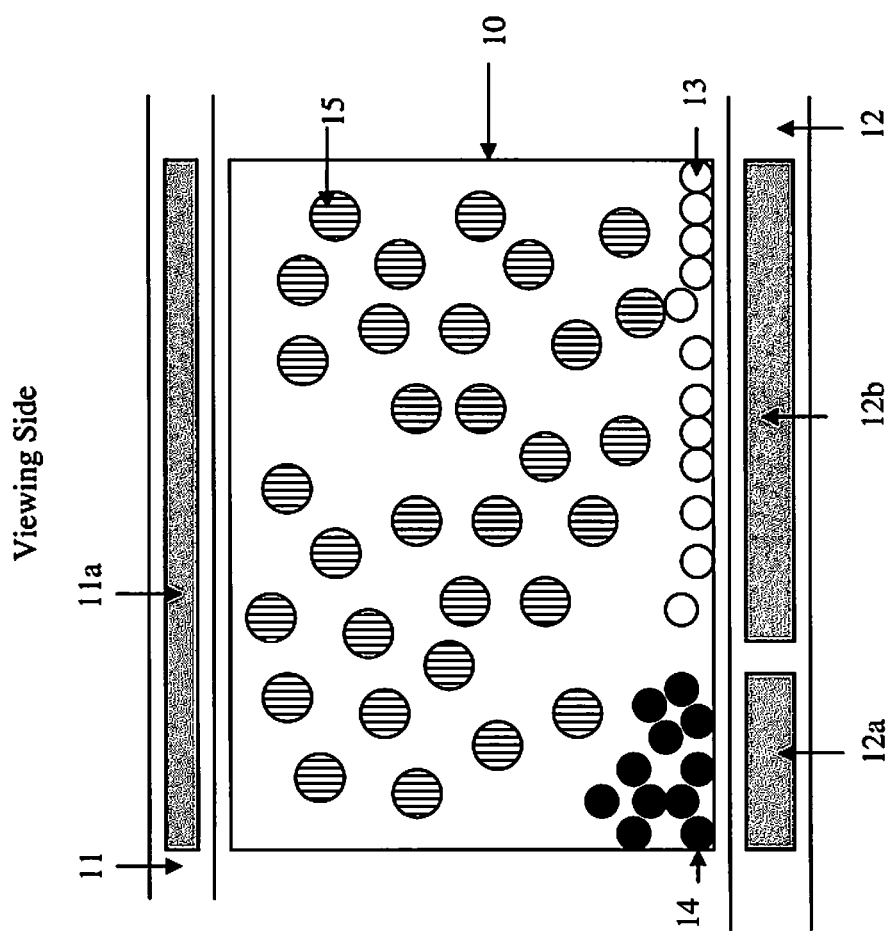
Figure 1C:
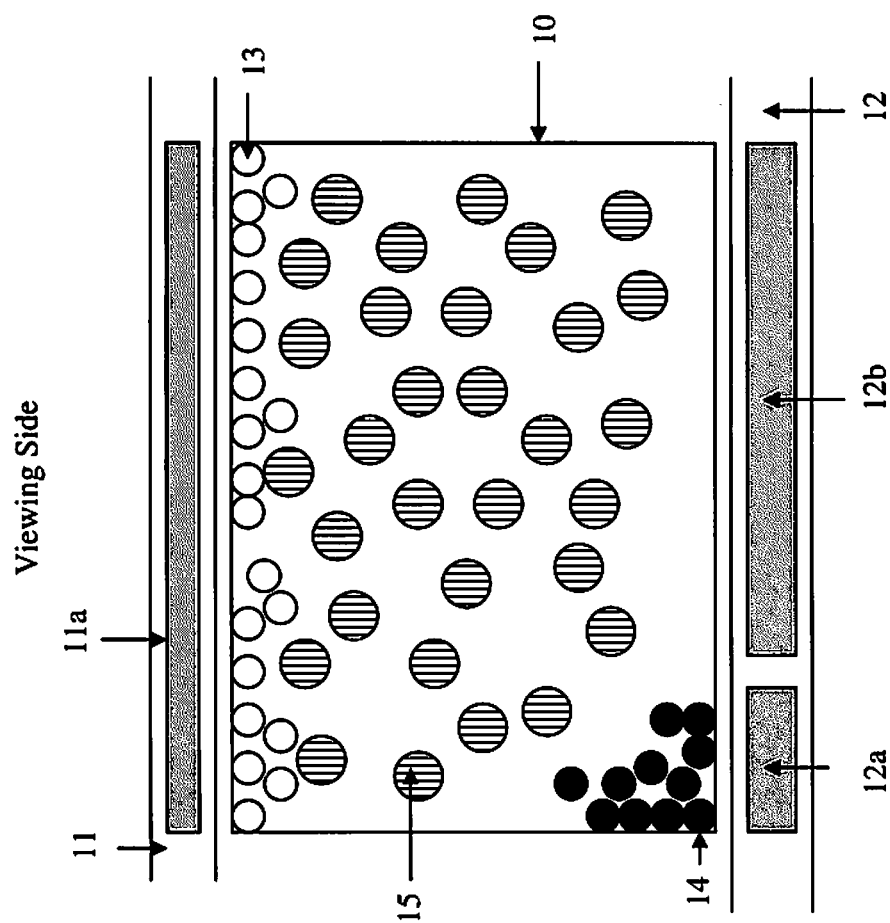

FIGS. 1a-1c depict how a display cell of the present invention may display three different color states when a display fluid comprising three types of particles as described above is filled in the display cell.

As shown in FIG. 1a, a display cell (10) is sandwiched between a first layer (11) comprising a common electrode (11a) and a second layer (12) comprising pixel electrodes (12a and 12b) and the display cell is filled with an electrophoretic fluid comprising three types of particles, white charged pigment particles (13), black charged pigment particles (14) and non-charged or slightly charged color particles (15), dispersed in a clear and colorless solvent. In this example, the color particles (15) are of the red color.

The white and black pigment particles are oppositely charged. For example, if the black pigment particles are positively charged, then the white pigment particles are negatively charged. Accordingly, the two types of charged pigment particles (13 and 14) may move towards the common electrode (11a) or the pixel electrodes (12a or 12b), depending on the charge polarity of the particles and the voltage potential difference applied to the common electrode and the pixel electrodes.

In this example, the common electrode is on the viewing side.

It is also noted that there may be more than two pixel electrodes associated with a display cell.

The color particles (15), as stated above, are particles which are non-charged or slightly charged, and therefore, they remain almost stationary during operation of the display device and are substantially uniformly dispersed throughout the electrophoretic fluid in the display cell.

In FIG. 1a, when proper voltages are applied to the common electrode (11a) and the two pixel electrodes (12a and 12b), the charged black particles (14) would move to be near or at the common electrode (11a) and the oppositely charged white pigment particles (13) would move to be near or at one of the pixel electrodes (e.g., 12b), causing the black color to be seen at the viewing side.

It is also possible for the voltages to be set to cause the white charged pigment particles to move to be at or near both pixel electrodes (12a and 12b), to display the black color.

In FIG. 1b, when proper voltages are applied to the common electrode (11a) and the two pixel electrodes (12a and 12b), the charged black particles (14) would move to be near or at one of the pixel electrodes (e.g., 12a) and the oppositely charged white pigment particles (13) would move to be near or at the other pixel electrode (12b), causing the red color (i.e., the color of the color particles (15)) to be seen at the viewing side.

In this scenario, the color particles (15) act as a red color filter for the light reflected by the white particles, achieving the red color.

In one embodiment as shown, the black charged pigment particles move to be near or at the smaller of the two pixel electrodes in order to achieve better brightness of the red color. However it is also possible to have the two pixel electrodes of the same size.

In FIG. 1c, when proper voltages are applied to the common electrode (11a) and the two pixel electrodes (12a and 12b), the white pigment particles (13) would move to be near or at the common electrode (11a) and the oppositely charged black particles would move to be near or at one of the pixel electrodes (e.g., 12a), causing the white color to be seen at the viewing side. It is also possible for the voltages to be set to cause the black particles to move to be at or near both pixel electrodes (12a and 12b), when the white color is being displayed.

Figure 2A:
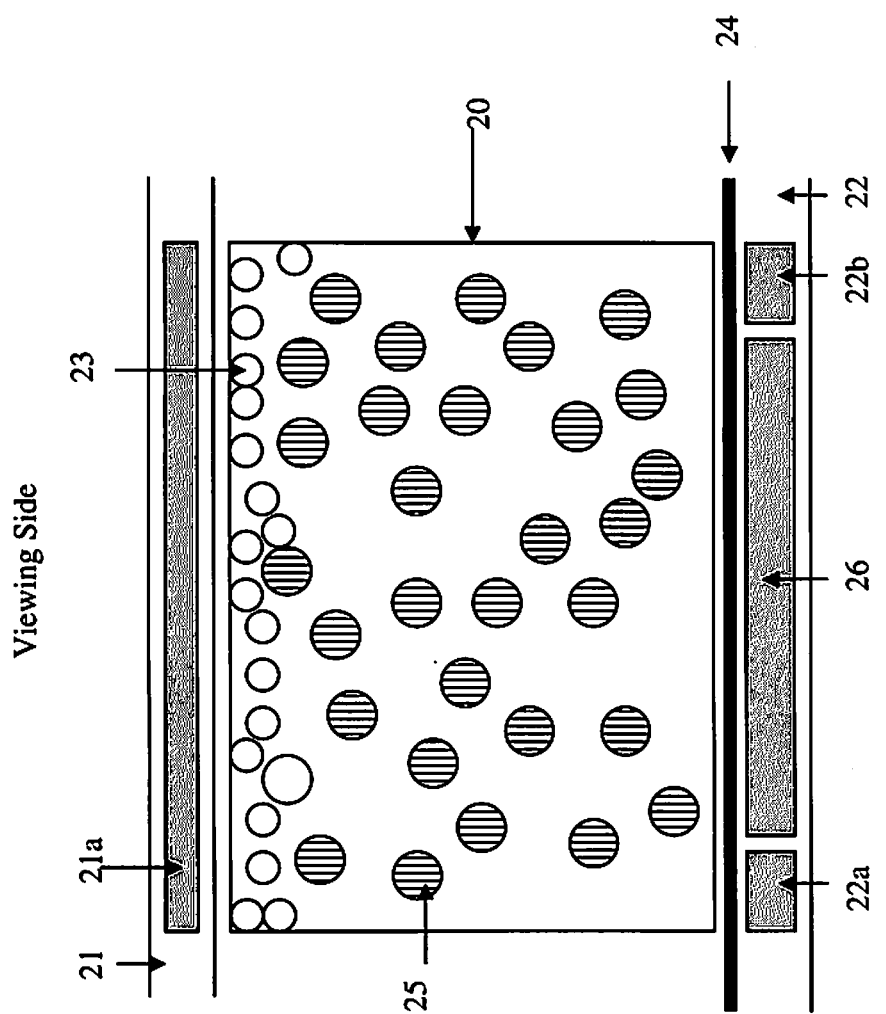
FIGS. 2a-2c depict an alternative design.
Figure 2B:
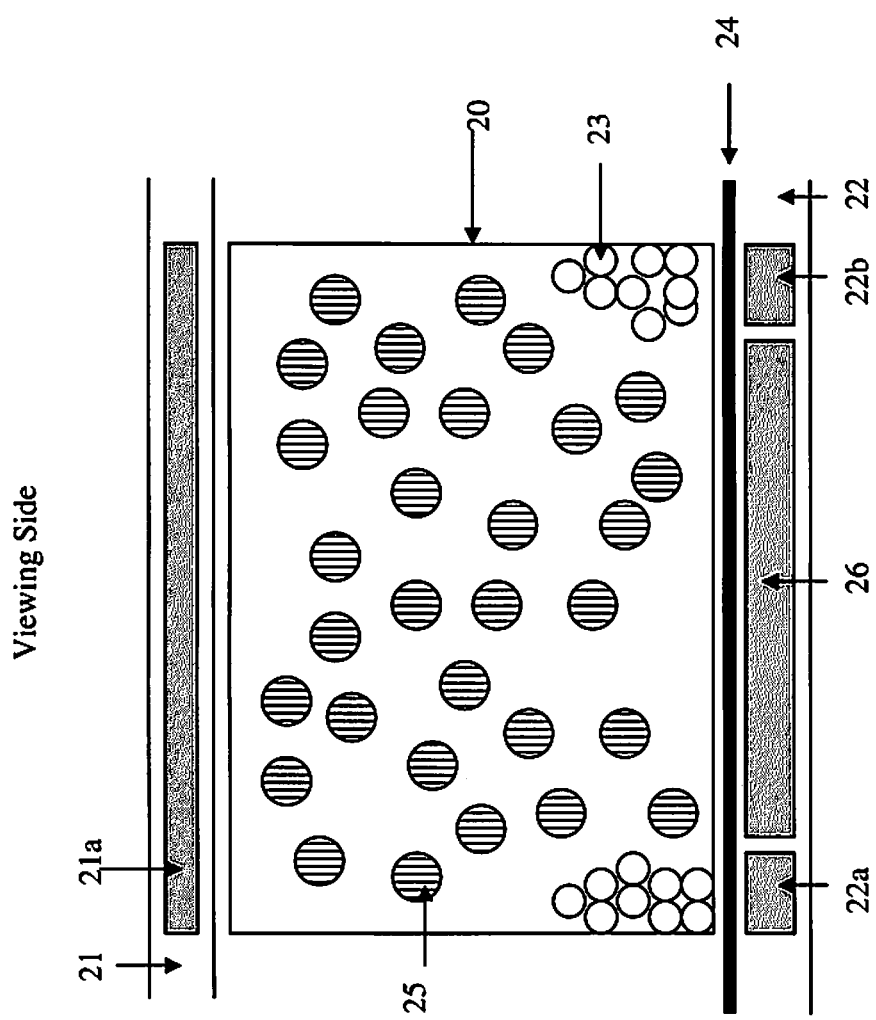
Figure 2C:
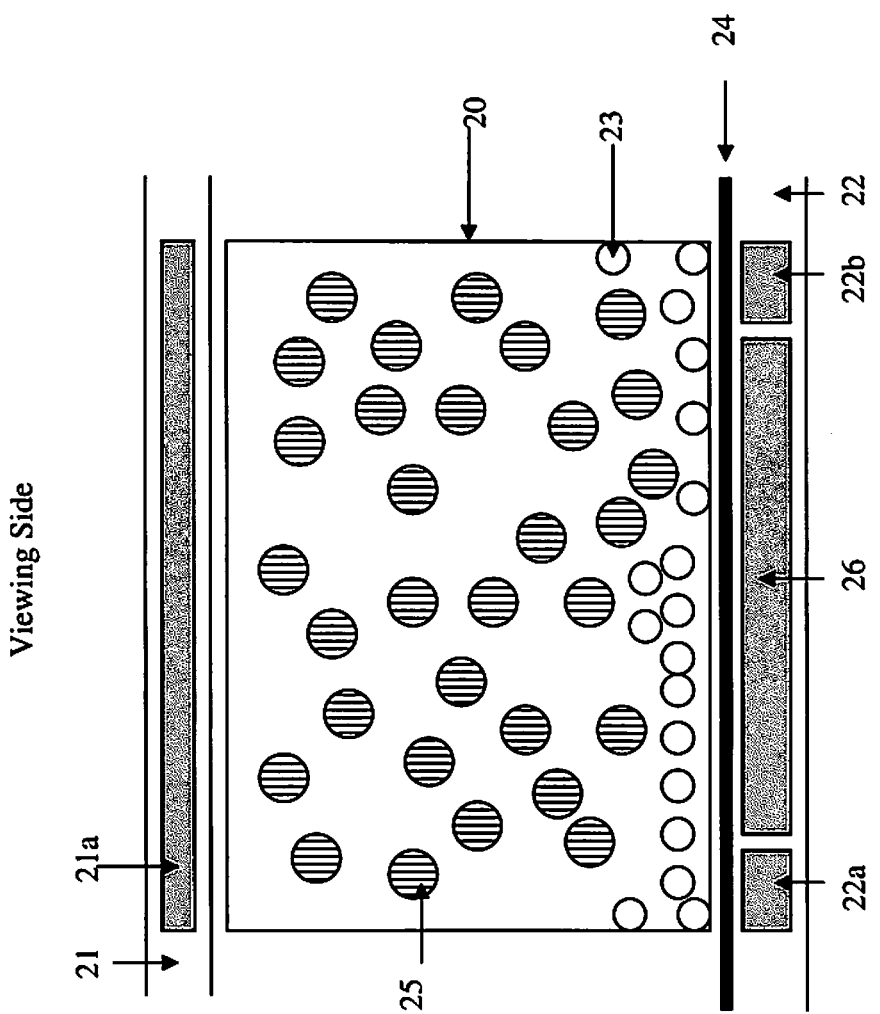

FIGS. 2a-2c illustrate an alternative design of the present invention. As shown in FIG. 2a, a display cell (20) is sandwiched between a first layer (21) comprising a common electrode (21a) and a second layer (22) comprising one pixel electrode (26) and two in-plane electrodes (22a and 22b). The pixel electrode (26) is between the two in-plane electrodes (22a and 22b) and there is a gap between the electrodes.

In practice, it is also possible to have only one in-plane electrode next to the pixel electrode.

In this design, there is a black background layer (24) which may be above or beneath the second layer (22) or the second layer may serve as the background layer.

The display cell (20) is filled with an electrophoretic fluid comprising two types of particles, white charged pigment particles (23) and non-charged or slightly charged color particles (25), dispersed in a clear and colorless solvent. In this example, the color particles (25) are of the red color.

Other features (e.g., charge controlling agents, solvents, material choices, etc.) described above for the three particle system are also applicable to this design.

The white pigment particles may be positively or negatively charged. In this example, the common electrode is on the viewing side.

In FIG. 2a, when proper voltages are applied to the common electrode (21a) and the pixel and in-plane electrodes (26, 22a and 22b), the charged white pigment particles (23) would move to be near or at the common electrode (21a), causing the white color to be seen at the viewing side.

In FIG. 2b, when proper voltages are applied to the common electrode (21a) and the pixel and in-plane electrodes (26, 22a and 22b), the charged white particles (23) would move to be near or at the in-plane electrodes (22a and 22b), causing the color of the background layer (i.e., black) to be seen at the viewing side. In this scenario, the red color of the color particles (25) is absorbed by the black background color.

In FIG. 2c, when proper voltages are applied to the common electrode (21a) and the pixel and in-plane electrodes (26, 22a and 22b), the white pigment particles (23) would move to be near or at the pixel and in-plane electrodes, causing the red color to be seen at the viewing side. In this scenario, the red particles (25) act as a red color filter for the light reflected by the white particles, achieving the red color.

While in the examples of FIGS. 1 and 2, the color particles are of the red color, in practice, they may be of the green, blue or another color, as required by the display application.

The display cells as shown in FIGS. 1 and 2 therefore are ideal for a color display device wherein each pixel consists of three sub pixels, one of which has red particles as shown in FIGS. 1 and 2, another of which has green particles, and a third of which has blue particles.

FIG. 3 illustrates how multiple colors are displayed with a display device comprising the display fluid of the present invention. Each display cell represents a sub-pixel and each pixel has three sub-pixels. The three display cells, each representing a sub-pixel, are filled with display fluids as described above.

Figure 3A:
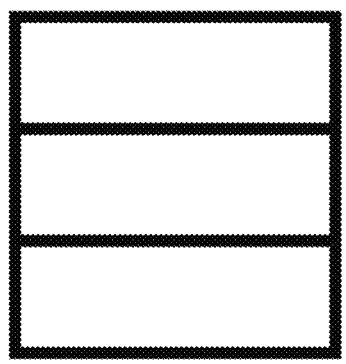
FIGS. 3a-3e illustrate the color display application of the present invention.
Figure 3B:
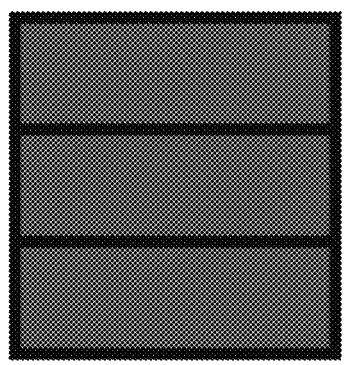
Figure 3C:
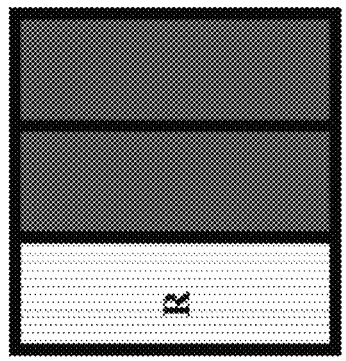
Figure 3D:
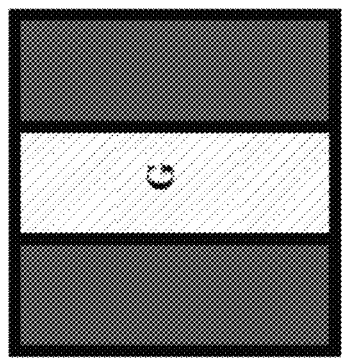
Figure 3E:
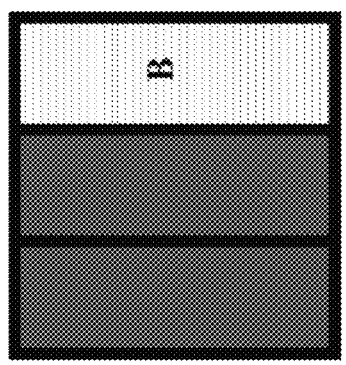

In FIG. 3a, when a white pixel is desired, all three sub-pixels are turned to the white color state. In FIG. 3b, when a black pixel is desired, all three sub-pixels are turned to the black state. FIG. 3c, when a red color is desired, one of the sub-pixel is turned to red (as shown in FIG. 1b or 2c) and the remaining two sub-pixels are turned to the black state for maximum color saturation. Similarly, FIG. 3d and FIG. 3e display the green and blue colors respectively. Alternatively, in FIGS. 3c, 3d and 3e, one of the sub-pixel is driven to the color state while the remaining two sub-pixels are driven to the white state for maximum brightness (at the expense of the color saturation). Further alternatively, in FIGS. 3c, 3d and 3e, one of the sub-pixel is driven to the color state while the remaining two sub-pixels are driven to the black and white states respectively. Such a full color display can have the same black and white characters of a good black and white display, but also show red, green and blue colors of high quality.

It is described above that each display cell represents a sub-pixel and each pixel consists of three sub-pixels. The three display cells, each representing a sub-pixel, are filled with display fluids comprising red, green and blue non-charged or slightly charged particles, respectively.

However, it is also within the scope of the present invention that all display cells are filled with a display fluid having the non-charged or slightly charged particles of the same color. In this case, the resulting display device would have a monochrome option for images.

The display cells referred to in the present application may be of a conventional walled or partition type, a microencapsulated type or a microcup type. In the microcup type, the electrophoretic display cells may be sealed with a top sealing layer. There may also be an adhesive layer between the electrophoretic display cells and the common electrode. The term "display cell" is intended to refer to a micro-container which is individually filled with a display fluid. Examples of "display cell" include, but are not limited to, microcups, microcapsules, micro-channels, other partition-typed display cells and equivalents thereof.

While particular forms of the invention have been illustrated and described, it will be apparent that various modifications can be made without departing from the spirit and scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. An electrophoretic display comprising:
   an electrophoretic display fluid which comprises non-charged or slightly charged color particles, a first type of charged pigment particles, and a second type of charged pigment particles, all of which are dispersed in a solvent or solvent mixture, wherein the first and the second types of charged pigment particles are oppositely charged and one type has a color darker than the other type, and the non-charged or slightly charged color particles (i) remain stationary during operation of the display and are uniformly dispersed throughout the display fluid, and (ii) have a transparent polymeric matrix with dye molecules solubilized therein wherein the refractive index of the polymeric matrix matches that of the display fluid; and
   a first layer on the viewing side comprising a common electrode and a second layer comprising pixel electrodes of different sizes, and the electrophoretic display fluid is sandwiched between the first and the second layers;
   whereby in an area corresponding to a pair of a large pixel electrode and a small pixel electrode,
   (a) the color of the first type of charged pigment particles is displayed when the first type of charged pigment particles is at or near the first layer,
   (b) the color of the second type of charged pigment particles is displayed when the second type of charged pigment particles is at or near the first layer, and
   (c) the color of the non-charged or slightly charged color particles is displayed when the darker-colored charged pigment particles are at or near the small pixel electrode and the lighter-colored charged pigment particles are at or near the large pixel electrode.

2. The display of claim 1, wherein one of the first and second types of the charged pigment particles is white and the other is black.

3. The display of claim 2, wherein the slightly charged color particles carry the same charge polarity as the black charged pigment particles.

4. The display of claim 2, wherein the slightly charged color particles carry the same charge polarity as the white charged pigment particles.

5. The display of claim 2, wherein the non-charged or slightly charged color particles are red, green or blue.

6. The display of claim 1, wherein the solvent or solvent mixture is clear and colorless.

7. The display of claim 6, wherein said solvent is a hydrocarbon solvent.

8. The display of claim 1, wherein the electrophoretic display fluid further comprises a charge control agent.

9. The display of claim 1, wherein the electrophoretic display fluid is filled in display cells.

10. The display of claim 9, wherein the non-charged or slightly charged color particles are of different colors in the display cells.

11. The display of claim 9, wherein the non-charged or slightly charged particles are of the same color in all display cells.

12. The display of claim 1, wherein the non-charged or slightly charged particles are non-charged particles.

13. An electrophoretic display comprising:
    an electrophoretic display fluid which comprises non-charged or slightly charged color particles and only one type of charged pigment particles, both of which are dispersed in a solvent or solvent mixture, wherein the non-charged or slightly charged color particles (i) remain stationary during operation of the display and are uniformly dispersed throughout the display fluid, and (ii) have a transparent polymeric matrix with dye molecules solubilized therein wherein the refractive index of the polymeric matrix matches that of the display fluid;
    a first layer on the viewing side comprising a common electrode and a second layer comprising in-plane and pixel electrodes, wherein the electrophoretic display fluid is sandwiched between the first and the second layers; and
    a background layer;
    whereby in an area corresponding to a set of in-plane and pixel electrodes,
    (a) the color of the charged pigment particles is displayed when the charged pigment particles are at or near the first layer,
    (b) the color of the background layer is displayed when the charged pigment particles are at or near the in-plane electrodes and the non-charged or slightly charged color particles are scattered in the display fluid, and
    (c) the color of the non-charged or slightly charged color particles is displayed when the charged pigment particles are at or near the second layer.

14. The display of claim 13, wherein the charged pigment particles are white and the background layer is black.

15. The display of claim 14, wherein the non-charged or slightly charged color particles are red, green or blue.

16. The display of claim 14, wherein the solvent or solvent mixture is clear and colorless.

17. The display of claim 16, wherein said solvent is a hydrocarbon solvent.

18. The display of claim 13, wherein the electrophoretic display fluid further comprises a charge control agent.

19. The display of claim 13, wherein the electrophoretic display fluid is filled in display cells.

20. The display of claim 19, wherein the non-charged or slightly charged particles are of the same color in all display cells.

21. The display of claim 19, wherein the non-charged or slightly charged color particles are of different colors in the display cells.

22. The display of claim 13, wherein the non-charged or slightly charged particles are non-charged particles.

* * * * *